L. V. PELTON.
LICENSE DISPLAY DEVICE FOR VEHICLES.
APPLICATION FILED MAY 1, 1916.
1,250,644.
Patented Dec. 18, 1917.
2 SHEETS—SHEET 1.
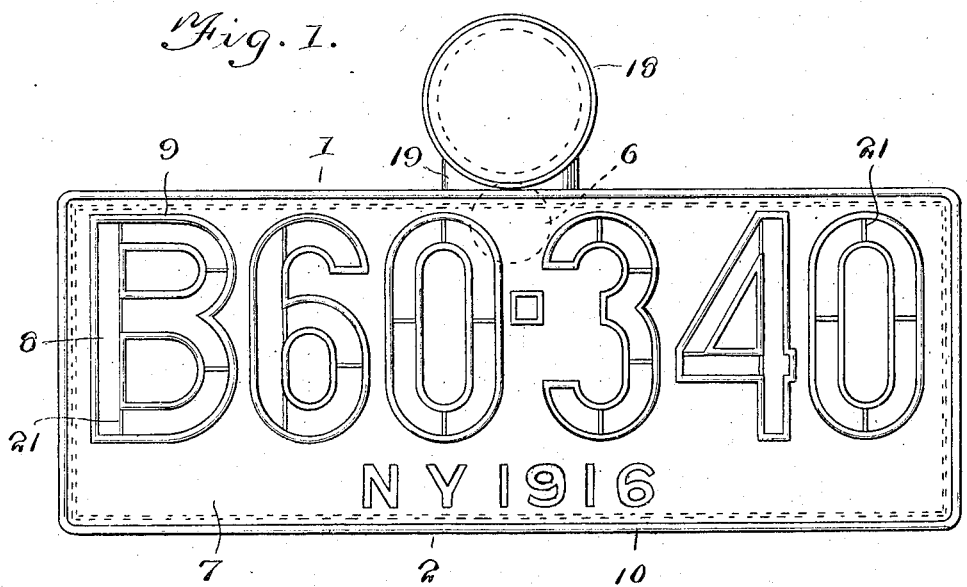
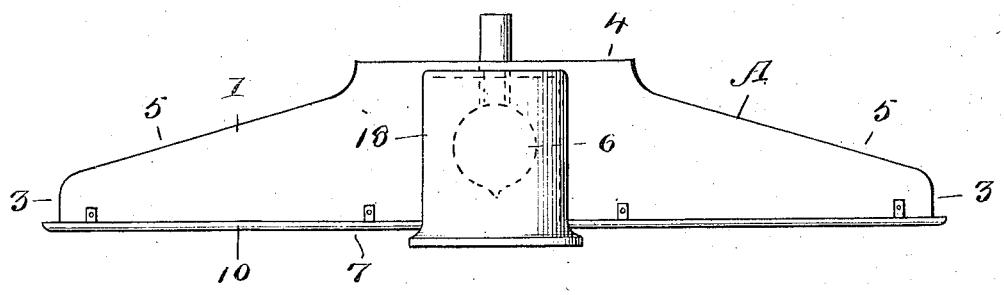
Inventor
L. V. Pelton
By Victor J. Evans
Attorney
Witnesses L. V. PELTON.
LICENSE DISPLAY DEVICE FOR VEHICLES.
APPLICATION FILED MAY 1, 1916.
1,250,644.
Patented Dec. 18, 1917.
2 SHEETS—SHEET 2.
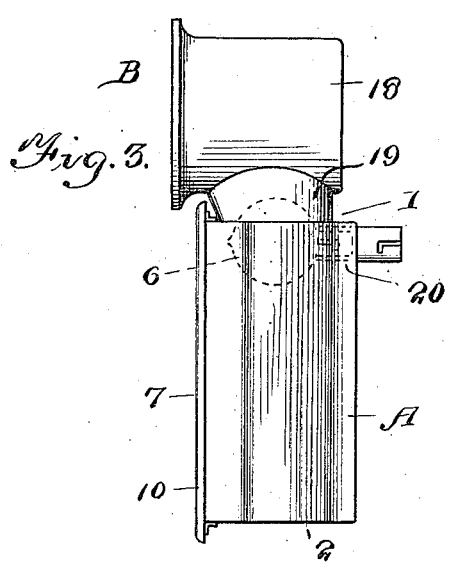
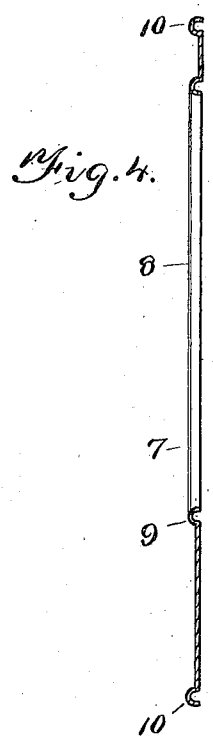
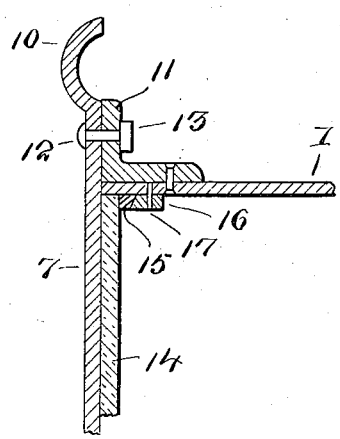
Inventor
L. V. Pelton
By Victor J. Evans
Attorney
Witnesses
E. R. Ruppert
P. M. Smith

UNITED STATES PATENT OFFICE.

LEWIS V. PELTON, OF DANSVILLE, NEW YORK, ASSIGNOR OF ONE-HALF TO EDWARD H. MALONEY, OF DANSVILLE, NEW YORK.

LICENSE-DISPLAY DEVICE FOR VEHICLES.

1,250,644.

Specification of Letters Patent.

Patented Dec. 18, 1917.

Application filed May 1, 1916. Serial No. 94,730.

*To all whom it may concern:*

Be it known that I, LEWIS V. PELTON, a citizen of the United States, residing at Dansville, in the county of Livingston and State of New York, have invented new and useful Improvements in License-Display Devices for Vehicles, of which the following is a specification.

This invention relates to license display devices for vehicles the object in view being to produce an article of the class referred to in which the characters on the license plate will be more easily distinguished during the day time and which may be seen at several times the distance at night time as compared with the ordinary illuminated license display device of the present type now in common use.

A further object in view is to construct the parts of the device in such manner that they may be readily assembled and disconnected in order to substitute a new license plate and a new glass when occasion demands.

A further object of the invention is to combine a tail lamp with the casing of the display device in such manner that the tail lamp and the license display plate will be simultaneously illuminated by means of a single lamp or light producing element.

With the above and other objects in view, the invention consists in the novel construction, combination and arrangement of parts, as herein described, illustrated and claimed.

In the accompanying drawings:—

Figure 1 is a face view of a combined license number display device and tail lamp embodying the present invention.

Fig. 2 is a top plan view of the same.

Fig. 3 is an end view thereof.

Fig. 4 is a vertical sectional view through the same showing the manner of forming the display plate.

Fig. 5 is an enlarged fragmentary vertical transverse section showing the manner of connecting and mounting the main parts of the device.

This device includes broadly a license number casing designated at A, and a lamp box designated at B. In the preferred embodiment of the invention, the casing includes a flat top wall 1, a flat bottom wall 2 parallel therethrough, two upright end walls parallel with each other and numbered 3, and a back wall made up of a flat upright central panel 4 preferably parallel with the front of the casing and two upright panels 5 extending obliquely from the ends of the central panel to the rear edges of the end walls 3. The inner surfaces of said panels are polished or plated so as to reflect the rays from an internally arranged source of light such as the electric lamp 6, and as shown herein the latter is disposed within a hole in the top wall 1 so that it rises partly above the same as indicated in Fig. 3.

The casing also includes a front wall 7 which constitutes the license number plate, and which, as shown, is formed with openings 8 extending through the same and shaped to represent letters, numerals and the like, the plate 7 being punched and shaped by means of dies so as to punch the openings 8 and at the same time press the metal outwardly around the margins of said openings as clearly indicated in Figs. 1 and 4 thereby providing reinforcing or stiffening flanges 9 which project from the outer or exposed face of the plate. During the same pressing operation, the marginal portions of the plate are shaped to form a surrounding bead 10 of concavo-convex shape in cross section the rounded or convex face thereof being disposed toward the exposed surface of the plate as clearly indicated in the drawings.

Angle iron strips 11 are united to the casing A adjacent to the front edge thereof as shown in Fig. 5 and the plate 7 is secured thereto by means of bolts or screws 12 which are threaded into nuts 13 on the rear sides of the angle strips 11, the nuts 13 being preferably brazed or otherwise permanently united to the strips 11.

In rear of the plate 7 there is placed a panel 14 of translucent material such as white opal glass, the same being held in place between the plate 7 and a protecting gasket 15 behind which is a metal stop strip 16 secured by fasteners 17 to the outside walls of the casing 1. When the plate 7 is removed, the panel 14 may also be removed, thus enabling a new panel 14 to be substituted for one which has been broken.

The lamp box B containing the tail light and usually constituting a separate element from the number casing, includes in the present instance a cylindrical body or casing 18 whose axis is horizontal, its rear end being closed and its front end carrying a colored glass not necessary to illustrate and describe. This casing stands above the top of the number casing already described, and in order to support it therefrom I have used a tubular element or neck 19 whose lower end is united with the top wall 1 of the casing A around the hole therein, and whose upper end is united with the wall or casing 18 of the lamp box around a properly shaped hole also formed therein. The neck may be cylindrical, but I preferably flare it upward at the front as best seen in Fig. 3, so that the opening in the bottom of the lamp box casing 18 is of ample size for the admission of rays of light. As seen in this view, the position of the lamp or bulb 6 is such that the rays of light from said lamp may be utilized for both of the casings. The lamp 6 is shown as provided with a socket 20 enabling a new bulb or lamp to be substituted whenever necessary. For this purpose the operator may gain access to the bulb through the removable front of the lower casing, thus rendering it unnecessary that the glass at the front of the lamp box shall be hinged as is common in tail lights. The panel 14 provides for a diffusion of the rays of light so that all of the openings in the plate 7 are equally illuminated throughout.

The device as a whole is constructed in the main of sheet metal of such a character that it may be operated upon by dies for the purpose herein above stated. Connecting bars or strips 21 are provided at places where they are needed to connect the inner portions of the characters to the outer portions thereof as indicated in Fig. 1. As a whole the device may be economically manufactured and placed on the market at about the same price as the present day license number display devices.

I claim:—

A device of the class described comprising a casing including a license display plate constituting its front wall, two upright end walls, a rear wall made up of a central panel parallel with the front wall and end panels diverging from the extremities of said central panel to the rear edges of said end walls, and bottom and top walls, the latter having a central opening; a tubular neck whose lower end is secured around said opening and whose front inclines forward and upward; a horizontally disposed cylindrical lamp box having an opening in its bottom communicating with the upper end of said neck; a lamp socket in the rear wall of said casing, and a lamp carried by said socket, projected partly through said casing opening, and directing its rays into both the casing and the lamp box, for the purpose set forth.

In testimony whereof I affix my signature.

LEWIS V. PELTON.

Copies of this patent may be obtained for five cents each, by addressing the "Commissioner of Patents, Washington, D. C."